United States Patent
Noh et al.

(10) Patent No.: US 11,902,201 B2
(45) Date of Patent: Feb. 13, 2024

(54) METHOD AND DEVICE FOR GENERATING REFERENCE SIGNAL SEQUENCE FOR PAPR REDUCTION IN MOBILE COMMUNICATION SYSTEM

(71) Applicant: Samsung Electronics Co., Ltd., Suwon-si (KR)

(72) Inventors: Hoondong Noh, Suwon-si (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 17/273,257

(22) PCT Filed: Sep. 5, 2019

(86) PCT No.: PCT/KR2019/011492
§ 371 (c)(1),
(2) Date: Mar. 3, 2021

(87) PCT Pub. No.: WO2020/050653
PCT Pub. Date: Mar. 12, 2020

(65) Prior Publication Data
US 2021/0328734 A1  Oct. 21, 2021

(30) Foreign Application Priority Data

Sep. 5, 2018 (KR) .................. 10-2018-0106189
Sep. 7, 2018 (KR) .................. 10-2018-0107371
Oct. 26, 2018 (KR) .................. 10-2018-0129347

(51) Int. Cl.
*H04L 5/00* (2006.01)
*H04J 13/00* (2011.01)
(Continued)

(52) U.S. Cl.
CPC .......... *H04L 5/005* (2013.01); *H04J 13/0025* (2013.01); *H04W 72/23* (2023.01); *H04W 72/51* (2023.01)

(58) Field of Classification Search
CPC .... H04J 13/0025; H04L 5/0007; H04L 5/005; H04L 5/0051; H04L 27/2613;
(Continued)

(56) References Cited

U.S. PATENT DOCUMENTS 9,265,033 B2 * 2/2016 Seo ................. H04L 5/0048
9,807,617 B2 * 10/2017 Zhu ................. H04L 5/0023
(Continued)

FOREIGN PATENT DOCUMENTS

CN  102202027 B * 8/2015 ........... H04L 5/0007
CN  107431682 A * 12/2017 ........... H04B 7/0452
(Continued)

OTHER PUBLICATIONS

European Patent Office, "Supplementary European Search Report" dated Sep. 2, 2021, in connection with European Patent Application No. 19857235.6, 10 pages.
(Continued)

*Primary Examiner* — Eric Nowlin

(57) ABSTRACT

The disclosure relates to a method, performed by a user equipment (UE), of transmitting or receiving signals in a wireless communication system, and in an embodiment, the UE transmits, to a base station (BS), UE capability information regarding sequence initialization of a demodulation reference signal (DMRS), receives, from the BS, DMRS configuration information determined based on the UE capability information, and receives the DMRS from the BS based on the DMRS configuration information, wherein the DMRS is generated based on a sequence initialization parameter determined based on a code division multiplexing
(Continued)

(CDM) group identifier included in the DMRS configuration information.

13 Claims, 5 Drawing Sheets

(51) Int. Cl.
  *H04W 72/23* (2023.01)
  *H04W 72/51* (2023.01)
(58) Field of Classification Search
  CPC .. H04L 27/2614; H04L 27/262; H04W 72/23; H04W 72/51
  See application file for complete search history.

(56) References Cited

U.S. PATENT DOCUMENTS

| | | | |
|---|---|---|---|
| 10,333,671 B2 | 6/2019 | Seo et al. | |
| 10,644,849 B2 * | 5/2020 | Yoon | H04L 5/0007 |
| 11,290,246 B2 * | 3/2022 | Song | H04L 27/2613 |
| 11,343,043 B2 * | 5/2022 | Kwak | H04L 5/0026 |
| 11,418,992 B2 * | 8/2022 | Nammi | H04B 17/318 |
| 11,637,729 B2 * | 4/2023 | Shi | H04L 5/0007 |
| | | | 375/262 |
| 11,737,104 B2 * | 8/2023 | Su | H04L 5/0091 |
| | | | 370/329 |
| 2013/0235819 A1 * | 9/2013 | Zhang | H04W 72/04 |
| | | | 370/329 |
| 2013/0308555 A1 * | 11/2013 | Ho | H04L 5/0048 |
| | | | 370/328 |
| 2013/0343340 A1 * | 12/2013 | Seo | H04W 72/04 |
| | | | 370/330 |
| 2018/0026684 A1 * | 1/2018 | Wei | H04W 72/0453 |
| | | | 370/329 |
| 2018/0132223 A1 * | 5/2018 | Sankar | H04W 72/51 |
| 2018/0278395 A1 * | 9/2018 | Yoon | H04L 5/0007 |
| 2020/0127786 A1 * | 4/2020 | Kwak | H04B 7/0417 |
| 2020/0266963 A1 * | 8/2020 | Song | H04L 27/2613 |
| 2021/0160860 A1 | 5/2021 | Ko et al. | |
| 2021/0328846 A1 * | 10/2021 | Frenne | H04W 72/23 |
| 2021/0385038 A1 * | 12/2021 | Gao | H04J 13/12 |
| 2022/0052890 A1 * | 2/2022 | Shi | H04L 5/0048 |
| 2022/0061037 A1 * | 2/2022 | Lee | H04L 5/0091 |
| 2022/0256530 A1 * | 8/2022 | Wang | H04L 27/26025 |

FOREIGN PATENT DOCUMENTS

| | | | | |
|---|---|---|---|---|
| CN | 107439047 A | | 12/2017 | |
| CN | 108111278 A | * | 6/2018 | .......... H04B 17/318 |
| CN | 107431682 B | * | 6/2021 | .......... H04B 7/0452 |
| EP | 3439218 A1 | | 2/2019 | |
| EP | 3439218 B1 | * | 1/2021 | .......... H04J 13/0003 |
| EP | 3836662 A1 | * | 6/2021 | ........... H04L 5/0051 |
| EP | 3955535 A1 | * | 2/2022 | .......... H04L 27/2602 |
| EP | 3962203 A1 | * | 3/2022 | ....... H04L 27/26025 |
| JP | 2020530241 A | * | 10/2020 | |
| KR | 10-1789618 B1 | | 10/2017 | |
| KR | 20170117051 A | * | 10/2017 | |
| KR | 20200038986 A | * | 4/2020 | |
| KR | 102198015 B1 | * | 1/2021 | |
| KR | 20210121267 A | * | 10/2021 | |
| WO | 2017171314 A1 | | 10/2017 | |
| WO | WO-2019029343 A1 | * | 2/2019 | .......... H04B 17/318 |
| WO | WO-2020042016 A1 | * | 3/2020 | |

OTHER PUBLICATIONS

Ericsson, "Benefits of resource specific DMRS mapping", 3GPP TSG RAN WG1 Meeting #93, R1-1806231, Busan, Korea, May 21-25, 2018, 4 pages.
Ericsson, "Feature lead proposal on low PAPR DMRS", 3GPP TSG RAN WG1 Meeting #94bis, R1-811988, Chengdu, China, Oct. 8-12, 2018, 6 pages.
Ericsson, "On specification-based solutions to the DMRS PAPR issue", 3GPP TSG RAN WG1 Meeting #94-bis, R1-1811542, Chengdu, China, Oct. 8-12, 2018, 5 pages.
Panasonic, "On low PAPR RS in NR MIMO in Rel. 16", 3GPP TSG RAN WG1 Meeting #95, R1-1813136, Spokane, USA, Nov. 12-16, 2018, 3 pages.
International Search Report and Written Opinion of the International Searching Authority in connection with International Application No. PCT/KR2019/011492 dated Dec. 13, 2019, 11 pages.
Intel Corporation, "Remaining Issues on DM-RS," R1-1800316, 3GPP TSG RAN WG1 Meeting AH 1801, Vancouver, Canada, Jan. 22-26, 2018, 10 pages.
Qualcomm, "First Summary of Issues for PDSCH/PUSCH's DM-RS," R1-1805611, 3GPP TSG RAN WG1 Meeting #92bis, Sanya, China, Apr. 16-20, 2018, 18 pages.
Qualcomm, "Second Summary of Issues for PDSCH/PUSCH's DM-RS," R1-1805691, 3GPP TSG RAN WG1 Meeting #92bis, Sanya, China, Apr. 16-20, 2018, 14 pages.
Office Action dated Nov. 21, 2022 in connection with India Patent Application No. 202137008479, 5 pages.
European Patent Office, "Communication under Rule 71(3) EPC," dated May 15, 2023, in connection with European Patent Application No. 19857235.6, 57 pages.
Korean Office Action dated Aug. 3, 2023, in connection with Korean Patent Application No. 10-2018-0129347, 5 pages.
Office Action dated Oct. 19, 2023, in connection with Chinese Patent Application No. 201980058148.1, 33 pages.

* cited by examiner

METHOD AND DEVICE FOR GENERATING REFERENCE SIGNAL SEQUENCE FOR PAPR REDUCTION IN MOBILE COMMUNICATION SYSTEM

CROSS-REFERENCE TO RELATED APPLICATIONS

This application is a 371 of International Application No. PCT/KR2019/011492 filed on Sep. 5, 2019, which claims priority to Korean Patent Application No. 10-2018-0106189 filed on Sep. 5, 2018, Korean Patent Application No. 10-2018-0107371 filed on Sep. 7, 2018, and Korean Patent Application No. 10-2018-0129347 filed on Oct. 26, 2018, the disclosures of which are herein incorporated by reference in their entirety.

BACKGROUND

1. Field

The disclosure relates to a method and device for generating a reference signal sequence to reduce a peak-to-average power ratio (PAPR) in a mobile communication system.

2. Description of Related Art

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. The 5G communication system defined by the 3rd Generation Partnership Project (3GPP) is called a new radio (NR) system. Implementation of the 5G communication system using ultra-high frequency (millimeter wave (mmWave)) bands, e.g., 60 giga hertz (GHz) bands, is being considered to attain higher data transfer rates. To reduce propagation loss of radio waves and increase a transmission range of radio waves in the ultra-high frequency bands, beamforming, massive multiple-input multiple-output (MIMO), full dimensional MIMO (FD-MIMO), array antennas, analog beamforming, and large-scale antenna techniques are under discussion for the 5G communication system and are applied to an NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM) method, e.g., hybrid FSK and QAM modulation (FQAM), sliding window superposition coding (SWSC), and advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value in human life by collecting and analyzing data generated from the things connected. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

In this regard, various attempts to apply the 5G communication system to the IoT network are being made. For example, 5G communication such as a sensor network, M2M, MTC, etc., is implemented by such techniques as beamforming, MIMO, and array antenna, etc. Even application of a cloud radio access network (cloud RAN) as the aforementioned big data processing technology may be an example of convergence of 5G and IoT technologies.

With the development of the aforementioned technologies and mobile communication systems, it is possible to provide various services, and there is a need for a method to provide the services effectively.

Embodiments of the disclosure provide an apparatus and method capable of effectively providing a service in a mobile communication system.

SUMMARY

The disclosure relates to a method, performed by a user equipment (UE), of transmitting or receiving signals in a wireless communication system, and in an embodiment, the UE transmits, to a base station (BS), UE capability information regarding sequence initialization of a demodulation reference signal (DMRS), receives, from the BS, DMRS configuration information determined based on the UE capability information, and receives the DMRS from the BS based on the DMRS configuration information, wherein the DMRS is generated based on a sequence initialization parameter determined based on a code division multiplexing (CDM) group identifier included in the DMRS configuration information.

According to an embodiment of the disclosure, services may be effectively provided in a mobile communication system.

DETAILED DESCRIPTION

Figure 1:
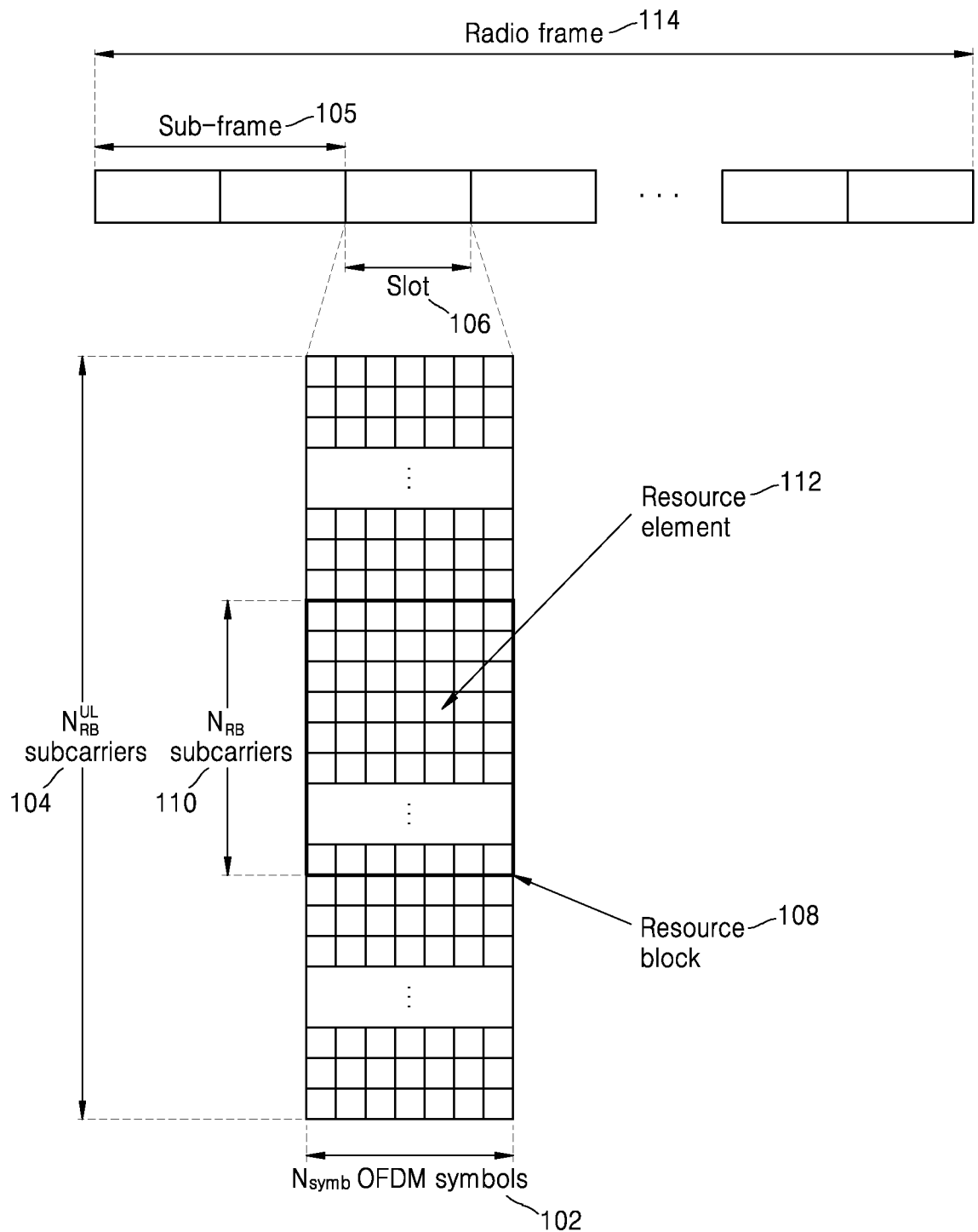
FIG. 1 shows a structure of a time-frequency domain, which is a radio resource domain in which data or a control channel is transmitted on a downlink in a long term evolution (LTE)/LTE advanced (LTE-A) system.

In an embodiment, a method, performed by a user equipment (UE), of transmitting or receiving signals in a wireless communication system includes: transmitting, to abase station (BS), UE capability information regarding sequence initialization of a demodulation reference signal (DMRS); receiving, from the BS, DMRS configuration information determined based on the UE capability information; and receiving the DMRS from the BS based on the DMRS configuration information, wherein the DMRS is generated based on a sequence initialization parameter determined based on a code division multiplexing (CDM) group identifier included in the DMRS configuration information.

The sequence initialization parameter may be determined based on the CDM group identifier and parameter $n'_{SCID}$ corresponding to the CDM group identifier, and the sequence initialization parameter of each of different CDM group identifiers determined to have the same $n'_{SCID}$ may have a different value based on the CDM group identifier.

The parameter $n'_{SCID}$ corresponding to the CDM group identifier may be determined for each CDM group identifier by using a parameter value obtained in DCI.

The sequence initialization parameter determined based on the CDM group identifier may be applied to both DMRS type 1 and DMRS type 2.

The DMRS may be generated based on the sequence initialization parameter determined based on the code division multiplexing (CDM) group identifier for a PUSCH or a PDSCH scheduled by a DCI format other than DCI format 0_0 or DCI format 1_0.

In an embodiment, a method, performed by abase station (BS), of transmitting or receiving signals in a wireless communication system includes: receiving, from a user equipment (UE), UE capability information regarding sequence initialization of a demodulation reference signal (DMRS); transmitting, to the UE, DMRS configuration information determined based on the UE capability information; and transmitting the DMRS to the UE, wherein the DMRS is generated based on a sequence initialization parameter determined based on a code division multiplexing (CDM) group identifier included in the DMRS configuration information.

The sequence initialization parameter may be determined based on the CDM group identifier and parameter $n'_{SCID}$ corresponding to the CDM group identifier, and the sequence initialization parameter of each of different CDM group identifiers determined to have the same $n'_{SCID}$ may have a different value based on the CDM group identifier.

The sequence initialization parameter determined based on the CDM group identifier may be applied to both DMRS type 1 and DMRS type 2.

In an embodiment, a user equipment (UE) for transmitting or receiving signals in a wireless communication system includes: a transceiver; and a processor, wherein the processor is configured to control the transceiver to transmit, to a base station (BS), UE capability information regarding sequence initialization of a demodulation reference signal (DMRS), receive, from the BS, DMRS configuration information determined based on the UE capability information, and receive the DMRS from the BS based on the DMRS configuration information, wherein the DMRS is generated based on a sequence initialization parameter determined based on a code division multiplexing (CDM) group identifier included in the DMRS configuration information.

In an embodiment, a base station (BS) for transmitting or receiving signals in a wireless communication system includes: a transceiver; and a processor, wherein the processor is configured to control the transceiver to receive, from a user equipment (UE), UE capability information regarding sequence initialization of a demodulation reference signal (DMRS), transmit, to the UE, DMRS configuration information determined based on the UE capability information, and transmit the DMRS to the UE, wherein the DMRS is generated based on a sequence initialization parameter determined based on a code division multiplexing (CDM) group identifier included in the DMRS configuration information.

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order.

Furthermore, the term 'unit' or 'module' as herein used refers to a software or hardware component, such as field programmable gate array (FPGA) or application specific integrated circuit (ASIC) which plays a certain role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

Throughout the specification, terms and definitions defined by standards for fifth generation (5G), new radio (NR), and long term evolution (LTE) systems will be used for convenience of explanation. The disclosure is not, however, limited by the terms and definitions, and may be equally applied to any systems that conform to other standards.

Although embodiments of the disclosure will be primarily focused on communication standards defined by the third generation partnership project (3GPP), the subject matter of the disclosure may also be applicable to other communication systems with a similar technical background with minor changes without significantly departing from the scope of the disclosure, which may be possible under the determination of those of ordinary skill in the art to which the disclosure pertains.

In FIG. 1, the horizontal axis represents a time domain, and the vertical axis represents a frequency domain. In the time domain, the minimum transmission unit is an orthogonal frequency division multiplexing (OFDM) symbol, and $N_{symb}$ OFDM symbols 102 make up one slot 106, and two slots make up one subframe 105. The slot is 0.5 ms long, and the subframe is 1.0 ms long. A radio frame 114 is a time domain interval comprised of 10 subframes. A minimum transmission unit in the frequency domain is a subcarrier, and bandwidth of the whole system transmission band may be comprised of a total of $N_{BW}$ subcarriers 104.

The basic resource unit in the time-frequency domain is a resource element (RE) 112, which may be represented with an OFDM symbol index and a subcarrier index. A resource block 108 (RB) or physical resource block (PRB) is defined with successive $N_{symb}$ OFDM symbols 102 in the time domain and successive $N_{RB}$ subcarriers 110 in the frequency domain. Accordingly, one RB 108 may include $N_{symb} \times N_{RB}$ REs 112. In general, a minimum transmission unit of data is an RB. In a general LTE system, $N_{symb}=7$, $N_{RB}=12$, and $N_{BW}$ and $N_{RB}$ are proportional to bandwidth of the system transmission band. Data transfer rate increases in proportion to the number of RBs scheduled for a user equipment (UE).

The LTE system defines and operates six transmission bandwidths. For a frequency division duplex (FDD) system differentiating and operating downlink and uplink with frequencies, downlink transmission bandwidth may differ from uplink transmission bandwidth. Channel bandwidth refers to radio frequency (RF) bandwidth corresponding to the system transmission bandwidth. Table 1 represents a correlation between system transmission bandwidth and channel bandwidth defined in the LTE system. For example, the LTE system having 10 MHz channel bandwidth has transmission bandwidth of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Figure 2:
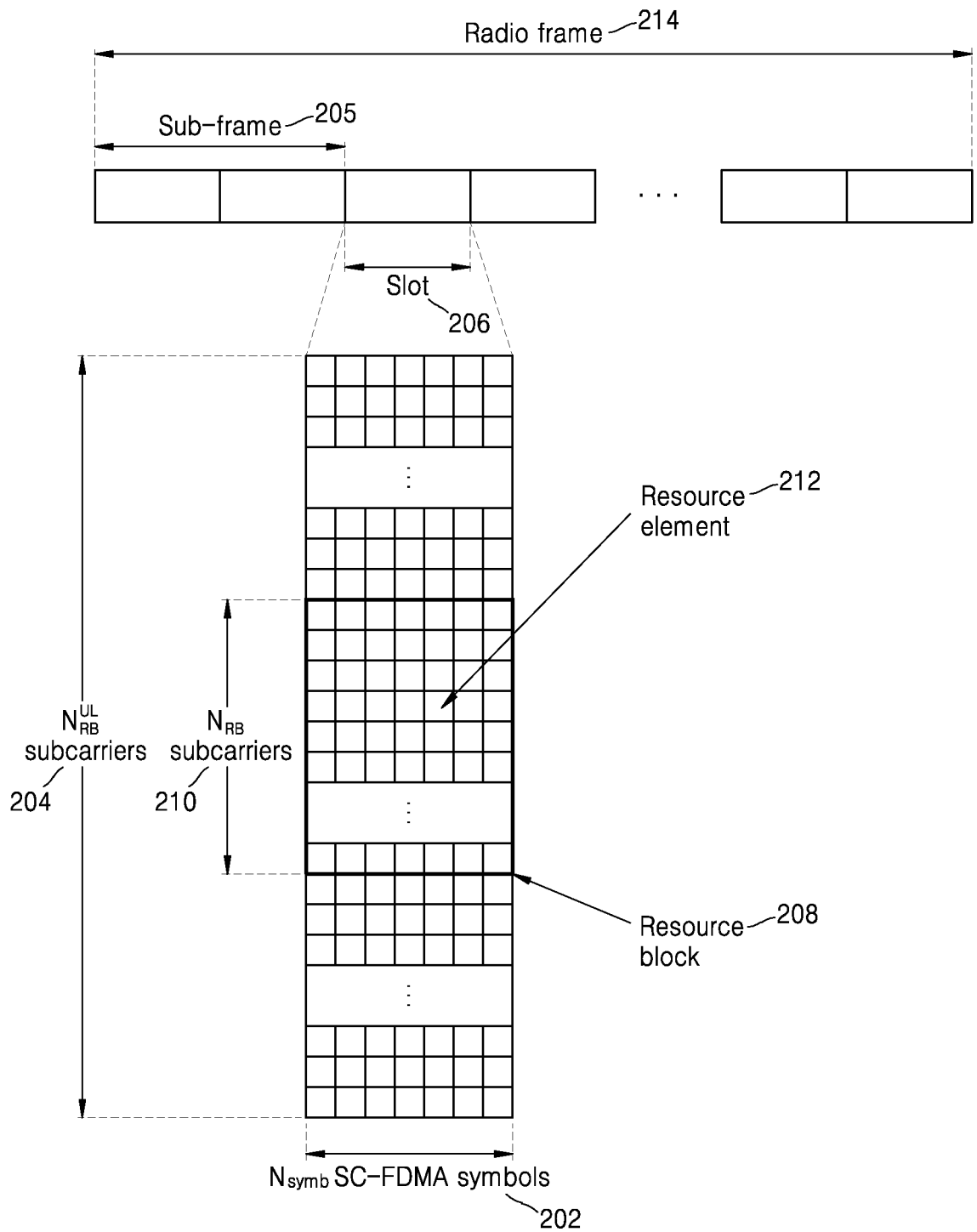
FIG. 2 shows a structure of a time-frequency domain, which is a radio resource domain in which data or a control channel is transmitted on an uplink in an LTE/LTE-A system.

FIG. 2 shows a structure of a time-frequency domain, which is a radio resource domain in which data or a control channel is transmitted on an uplink in an LTE/LTE-A system.

Referring to FIG. 2, the horizontal axis represents a time domain, and the vertical axis represents a frequency domain. A minimum transmission unit in the time domain is a single carrier frequency division multiple access (SC-FDMA) symbol 202, and $N_{symb}^{UL}$ SC-FDMA symbols make up one slot 206. Two slots make up one subframe 205. A minimum transmission unit in the frequency domain is a subcarrier, and the whole system transmission bandwidth 204 is comprised of a total of $N_{BW}$ subcarriers. $N_{BW}$ is proportional to the system transmission band.

The basic resource unit in the time-frequency domain is a resource element (RE) 212, which may be defined with an SC-FDMA symbol index and a subcarrier index. A resource block pair (RB pair) 208 is defined with $N_{symb}^{UL}$ successive SC-FDMA symbols in the time domain and $N_{sc}^{RB}$ successive subcarriers 210 in the frequency domain. Accordingly, one RB is comprised of $N_{symb}^{UL} \times N_{sc}^{RB}$ REs. In general, a minimum transmission unit of data or control information is an RB. A physical uplink control channel (PUCCH) is mapped to the frequency domain corresponding to 1 RB and transmitted in one subframe.

Even for a 5G or NR system, the similar downlink/uplink structure to FIGS. 1 and 2 is supported. The 5G or NR system has a more flexible structure on the time axis as compared with the LTE system, and specifically, supports a slot structure comprised of 14 OFDM symbols and a non-slot structures comprised of 1, 2, 3, 4, or 7 OFDM symbols. The non-slot structure may also be referred to as a mini-slot structure.

Figure 3:
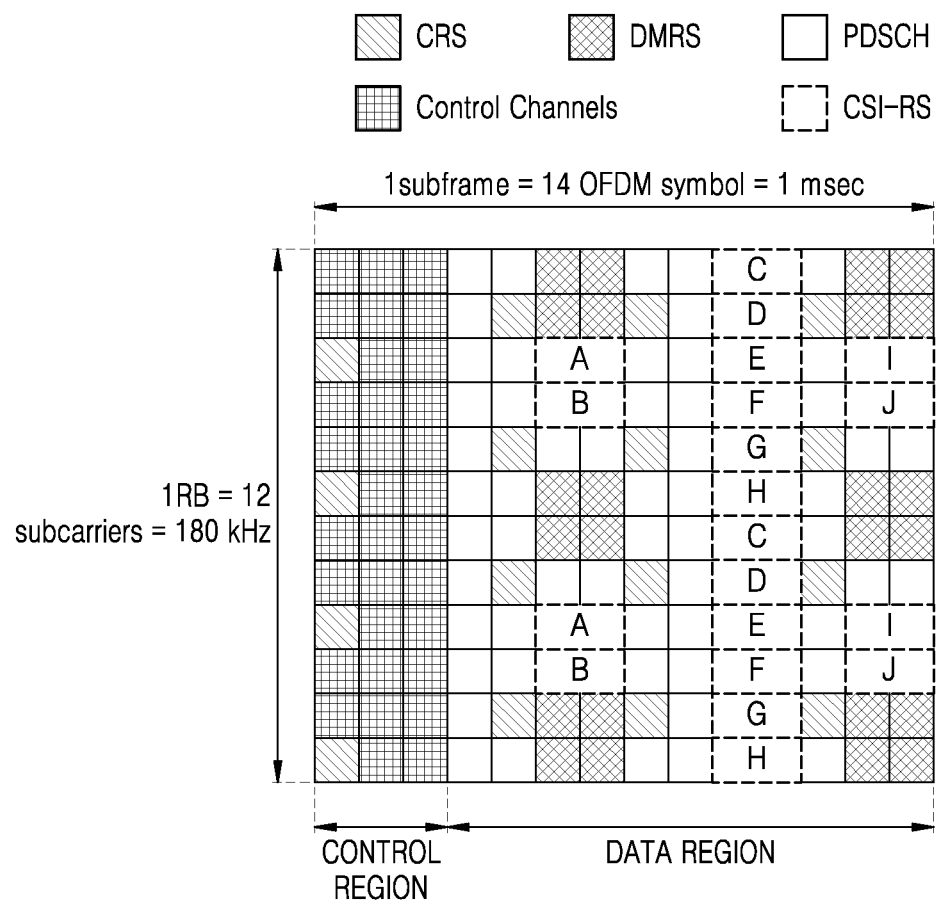
FIG. 3 shows a radio resource of one resource block (RB), which is a minimum unit to be scheduled on a downlink of an LTE/LTE-A system.

FIG. 3 shows a radio resource of one resource block (RB), which is a minimum unit to be scheduled on a downlink of an LTE/LTE-A system.

For a radio resource shown in FIG. 3, a plurality of different types of signals as in the following may be transmitted.

1. Cell specific RS (CRS): a reference signal that is periodically transmitted for all the UEs belonging to one cell and that may be shared by a plurality of UEs.
2. Demodulation reference signal (DMRS): a reference signal transmitted for a particular UE, which is transmitted only in a case of transmitting data to the UE. A DMRS may be comprised of a total of 8 DMRS ports. In the LTE/LTE-A system, ports 7 to 14 correspond to DMRS ports, and the ports maintain orthogonality to prevent interference between them by using code division multiplexing (CDM) or frequency division multiplexing (FDM).
3. Physical downlink shared channel (PDSCH): a data channel transmitted on a downlink, which is used by a BS to transmit traffic to a UE, and transmitted using REs where no reference signal is transmitted in the data region of FIG. 3.
4. Channel status information reference signal (CSI-RS): a reference signal transmitted for UEs belonging to one cell and used to measure a channel state. A plurality of CSI-RSs may be transmitted in one cell.
5. Other control channels (PHICH, PCFICH, PDCCH): provide control information required by a UE to receive a PDSCH or transmit ACK/NACK to operate HARQ for uplink data transmission.

Figure 4:
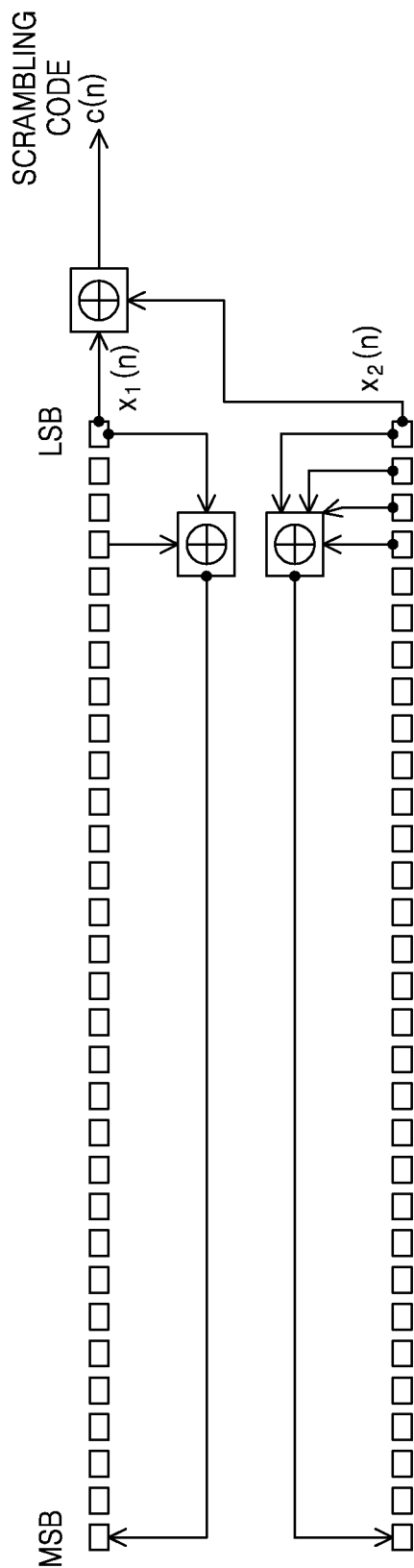
FIG. 4 shows a scrambling code generation procedure.

FIG. 4 shows a scrambling code generation procedure.

Referring to FIG. 4, as for an LTE system, a sequence of reference signals such as CRS, DMRS, CSI-RS, etc., and a sequence for scrambling of various channels such as PDCCH, PDSCH, PMCH, etc., are generated as a pseudo random (PN) sequence based on length-31 gold sequence. More specifically, as shown in FIG. 4, PN sequence c(n) is generated by concatenating a first m-sequence x1(n) generated from a polynomial $D^{31}+D^3+1$ of an upper register and a second m-sequence x(2n) generated from a polynomial $D^{31}+D^3+D^2+D+1$ of a lower register, as expressed in Equation 1 below:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 1]}$$

where Nc=1600, and the register is initialized as follows:
the first m-sequence x1(n) generated from the upper register is initialized to the following fixed pattern: x1(0)=1, x1(n)=0, n=1, 2, . . . , 30.
the first m-sequence x2(n) generated from the upper register is initialized by the following equation, according to a scrambling condition required for each signal.

$$c_{init}=\Sigma_{i=0}^{30} x_2(i) \cdot 2^i \quad \text{[Equation 2]}$$

In Equation 2, Cinit may be determined by applying a different method for each specific application.

For example, for each codeword q, a block of bits $b^{(q)}(0), \ldots, b^{(q)}(M_{bit}^{(q)}-1)$ may be scrambled according to Equation 3. where $M_{bit}^{(q)}$ is the number of bits included in the codeword q transmitted in a slot on the corresponding channel (PDSCH, PDCCH, or PMCH).

$$\tilde{b}^{(q)}(i)=(b^{(q)}(i)+c^{(q)}(i)) \bmod 2 \quad \text{[Equation 3]}$$

In Equation 3, the scrambling sequence $c^{(q)}(i)$ is determined based on Equation 1, and the scrambling sequence is initialized according to Cinit in the beginning of every subframe. Cinit is determined as in Equation 4 according to a type of the transport channel.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases} \quad \text{[Equation 4]}$$

where $n_{RNTI}$ is a radio network temporary identifier (RNTI) allocated for PDSCH transmission, $n_s$ is a slot number in the transmission frame, $N_{ID}^{cell}$ is a cell ID, and $N_{ID}^{MBSFN}$ is an MBSFN area identity. In one subframe, a maximum of two codewords may be transmitted, and thus q∈{0, 1}. When a single codeword is transmitted, q corresponds to 0.

A block of bits $\tilde{b}^{(q)}(0), \ldots, \tilde{b}^{(q)}(M_{bit}^{(q)}-1)$ scrambled according to Equation 3 then undergoes a suitable process that fits a situation, such as modulation, codeword-to-layer mapping, precoding, etc., and is mapped to REs and then transmitted.

In another example, as for a CRS, it has a slot number $n_s$ in a radio frame, and a reference signal having OFDM symbol number I in the slot has a sequence as in Equation 5:

$$r_{l,n_s}(m) = \frac{1}{\sqrt{2}}(1-2 \cdot c(2m)) + j\frac{1}{\sqrt{2}}(1-2 \cdot c(2m+1)), \quad \text{[Equation 5]}$$

$$m = 0, 1, \ldots, 2N_{RB}^{max,DL}-1$$

In this case, c(i) is determined according to Equation 1, and initialized based on Cinit in the beginning of every OFDM symbol. Cinit is determined according to equation 6:

$$c_{init}=2^{10} \cdot (7 \cdot (n_s+1)+l+1) \cdot (2 \cdot N_{ID}^{cell}+1)+2 \cdot N_{ID}^{cell}+N_{CP} \quad \text{[Equation 6]}$$

In Equation 6, Ncp has a value of 1 for normal CP and 2 for extended CP.

The CRS sequence generated by Equation 5 is mapped to a reference signal for antenna port p of slot $n_s$ according to Equation 7.

$$a_{k,l}^{(p)}=r_{l,n_s}(m') \quad \text{[Equation 7]}$$

In this case, subcarrier number k, OFDM symbol number I, and sequence number m' have the following relationship:

$$k = 6m + (v+v_{shift}) \bmod 6 \quad \text{[Equation 8]}$$

$$l = \begin{cases} 0, N_{symb}^{DL}-3 & \text{if } p \in \{0,1\} \\ 1 & \text{if } p \in \{2,3\} \end{cases}$$

$$m = 0, 1, \ldots, 2 \cdot N_{RB}^{DL}-1$$

$$m' = m + N_{RB}^{max,DL} - N_{RB}^{DL}$$

Furthermore, in Equation 8, variables v and $v_{shift}$ define a position of reference signal on the frequency axis as in Equation 9 according to I and p.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + (n_s \bmod 2) & \text{if } p = 3 \end{cases} \quad \text{[Equation 9]}$$

$$\text{and } v_{shift} = N_{ID}^{cell} \bmod 6$$

In another example, as for an LTE DMRS, Equation 2 is represented in Equation 10 below to transmit DMRS port p=5.

$$c_{init}=(\lfloor n_s/2 \rfloor+1) \cdot (2N_{ID}^{cell}+1) \cdot 2^{16}+n_{RNTI} \quad \text{[Equation 10]}$$

In Equation 10, $n_s$ denotes a slot number in the transmission frame, and $n_{RNTI}$ denotes UE ID. $N_{ID}^{cell}$ denotes cell ID. Alternatively, Equation 2 is represented in Equation 11 below to transmit DMRS port $p \in \{7, 8, \ldots 14\}$.

$$c_{init} = (\lfloor n_s/2 \rfloor + 1) \cdot (2 n_{ID}^{(nSCID)} + 1) \cdot 2^{16} + n_{SCID} \quad \text{[Equation 10]}$$

In Equation 11, $n_s$ denotes a slot number in the transmission frame, and $n_{SCID}$ denotes a scrambling ID having a value of 0 or 1, and the scrambling ID is assumed to be 0 unless otherwise mentioned. Furthermore, $n_{ID}^{(i)}$, $i=0, 1$ is determined as follows:

$n_{ID}^{(i)} = N_{ID}^{cell}$, if no value for $n_{ID}^{DMRS,i}$ is provided by higher layers or if DCI format 1A, 2B or 2C is used for the DCI associated with the PDSCH transmission $n_{ID}^{(i)} = N_{ID}^{DMRS,i}$, otherwise As described above, for the DMRS, initialization is performed in every subframe, and the reference signal to transmit DMRS port $p \in \{7, 8, \ldots, 14\}$ is expressed as in Equation 12 below:

$$r(m) = \frac{1}{\sqrt{2}}(1 - 2 \cdot c(2m)) + j\frac{1}{\sqrt{2}}(1 - 2 \cdot c(2m+1)), \quad \text{[Equation 12]}$$

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 13]}$$

$$m = 0, 1, \ldots, N_{RB}^{max,DL} - 1$$

In this case, c(i) is determined according to Equation 1, and initialized based on Cinit in the beginning of every OFDM symbol. Cinit is determined according to Equation 14:

$$c_{init} = 2^{10} \cdot (7 \cdot (n_s + 1) + l + 1) \cdot (2 \cdot N_{ID}^{CSI} + 1) + 2 \cdot N_{ID}^{CSI} + N_{CP} \quad \text{[Equation 14]}$$

In Equation 14, Ncp has a value of 1 for normal CP and 2 for extended CP. For $N_{ID}^{CSI}$, it may be configured separately by higher layer signaling, and has the same value as $N_{ID}^{cell}$ when it is not configured by the higher layer signaling.

Based on the equation 13, a reference signal sequence $r_{l,n_s}(m)$ as in Equation 15 below is mapped for antenna port p.

$$a_{k,l}^{(p)} = w_{l''} \cdot r_{l,n_s}(m') \quad \text{[Equation 15]}$$

where orthogonal cover code (OCC) $W_{l''}$, subcarrier number k, OFDM symbol number l, and sequence number m' have the following relationship:

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad \text{[Equation 16]}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

-continued $$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

where a maximum number of RBs supported by the LTE system for DL is represented by $N_{RB}^{max,DL} = 110$. Furthermore, as for the LTE system, a fixed DMRS pattern is used for each of the normal CP and the extended CP, so a DMRS sequence is generated as in Equation 11 by taking into account the number of DMRS REs for each associated PRB.

In another example, as for an LTE CSI-RS, it has a slot number $n_s$ in a radio frame, and a reference signal having OFDM symbol number I in the slot has a sequence as in Equation 13:

In the meantime, unlike the LTE system, in a 5G or NR system, increased cell-IDs, increased channel bandwidth, various subcarrier spacing support, slot based transmission and slot aggregation support, various reference signal RE mapping structures, etc., are considered. Hence, taking this into account, a method for generating reference signals and scrambling sequences may also be changed.

For example, the 5G or NR system supports numerologies as in table 2, so the number of slots in a frame comprised of 10 subframes having 1 ms duration is as in table 3. In the table 3, $N_{slot}^{frame,\mu}$ is the number of slots included in a frame, i.e., 10 ms, and $N_{slot}^{subframe,\mu}$ is the number of slots included in a subframe, i.e., 1 ms.

TABLE 2

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

The table 2 represents supported transmission numerologies.

TABLE 3

| μ | $N_{symb}^{slot}$ | $N_{slot}^{frame,\mu}$ | $N_{slot}^{frame,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

The table 3 represents the number of OFDM symbols per slot $N_{symb}^{slot}$ for normal cyclic prefix, meaning that, with slot number $n_s$ defined with respect to one frame as in the LTE system, a maximum number of $n_s$ may be changed according to the numerology. Hereinafter, the slot number changing by the numerology is denoted as $n_{s,f}^\mu$.

In the 5G or NR system, taking into account variable numerologies of the 5G or NR system, CSI-RS supports the following sequence initialization method: First, in the 5G or NR system, CSI-RS uses the same method as for generating the sequence as expressed in Equations 1 to 5, in which case sequence initialization as in Equation 17 below is used.

$$c_{init}=(2^{10}(N_{symb}^{slot}n_{s,f}^\mu+l+1)(2n_{ID}+1)+n_{ID}) \bmod 2^{31} \quad \text{[Equation 17]}$$

In Equation 17, $N_{symb}^{slot}$ and $n_{s,f}^\mu$ follows the above description, l is an OFMD symbol index in the slot, and $n_{ID}$ is scrambling ID configured by a higher layer. As described above, a sequence generated by Equations 1, 5, and 17 is mapped to an RE of $(k,l)_{p,\mu}$ according to a rule in Equation 18 below.

$$a_{k,l}^{(p,\mu)} = \beta_{CSIRS} w_f(k') \cdot w_t(l') \cdot r_{l,n_{s,f}}(m') \quad \text{[Equation 18]}$$

$$m' = \lfloor n\alpha \rfloor + k' + \left\lfloor \frac{k\rho}{N_{sc}^{RB}} \right\rfloor$$

$$k = nN_{sc}^{RB} + \bar{k} + k'$$

$$l = \bar{l} + l'$$

$$\alpha = \begin{cases} \rho & \text{for } X = 1 \\ 2\rho & \text{for } X > 1 \end{cases}$$

$$n = 0, 1, \ldots$$

In Equation 18, p is a CSI-RS port index, $\beta_{CSIRS}$ is transmit power of the CSI-RS, Wf(k') and Wt(l') are orthogonal cover code values according to values of k' and l' in tables 4 and 5, and $r_{l,n_{s,f}}(m')$ refers to a sequence value. Sequence index m' is defined as a function of PRB index n, α determined by CSI-RS density ρ, and frequency axis start position $\bar{k}$ and time axis start position $\bar{l}$ of a CSI-RS CDM group determined based on Table 4.

TABLE 4

Table 7.4.1.5.3-1: CSI-RS locations within a slot.

| Row | Ports X | Density ρ | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$, | 0 | 0 | 0 |
| 3 | 2 | 1, 0.5 | FD-CDM2 | $(k_0, l_0)$, | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0), (k_0, l_0 + 1),$ $(k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1),$ $(k_2, l_0 + 1), (k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0), (k_0, l_0 + 1),$ $(k_1, l_0 + 1), (k_2, l_0 + 1), (k_3, l_0 + 1), (k_0, l_1),$ $(k_1, l_1), (k_2, l_1), (k_3, l_1), (k_0, l_1 + 1), (k_1, l_1 + 1),$ $(k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1),$ $(k_2, l_1), (k_3, l_1)$ | 0, 1, 2, 3, 4, 5, 6, 7 | 0, 1 | 0,1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

TABLE 5

| Index | $w_f(k')$ | $w_t(l')$ |
|---|---|---|

Table 7.4.1.5.3-2:
The sequences $w_f(k')$ and $w_t(l')$ for cdm-Type equal to 'no CDM'.

| | | |
|---|---|---|
| 0 | 1 | 1 |

Table 7.4.1.5.3-3:
The sequences $w_f(k')$ and $w_t(l')$ for cdm-Type equal to 'FD-CDM2'.

| | | |
|---|---|---|
| 0 | [+1 +1] | 1 |
| 1 | [+1 −1] | 1 |

Table 7.4.1.5.3-4:
The sequences $w_f(k')$ and $w_t(l')$ for cdm-Type equal to 'CDM4'.

| | | |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

Table 7.4.1.5.3-5:
The sequences $w_f(k')$ and $w_t(l')$ for cdm Type equal to 'CDM8'.

| | | |
|---|---|---|
| 0 | [+1 +1] | [+1 +1 +1 +1] |
| 1 | [+1 −1] | [+1 +1 +1 +1] |
| 2 | [+1 +1] | [−1 −1 +1 −1] |
| 3 | [+1 1] | [+1 −1 +1 −1] |
| 4 | [+1 +1] | [−1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Referring to Equation 18 and Table 4, it may be seen that all CSI-RS ports use the same sequence in one CSI-RS resource and that one or more CDM groups that makes up one CSI-RS resource may be transmitted in the same OFDM symbol. Specifically, this means that, for the CSI-RS resource including 4 or more ports, a sequence of same values is repeated in the OFDM symbol and mapped to subcarriers, which may deteriorate peak-to-average-power-ratio (PAPR) characteristics of the OFDM symbol including the CSI-RS and may thus be a factor in increasing a dynamic range of a power amplifier (PA) of the BS and expenses for implementation and maintenance. Similar problems may occur for another RS such as a DMRS.

In the disclosure, to solve this problem, a method for making better PARR characteristics of an OFDM symbol including an RS by improving the sequence initialization method for the CSI-RS and the DMRS.

More specifically, the disclosure describes a method and apparatus for generating a reference signal to reduce a peak-to-average power ration (PAPR) of a mobile communication system. For a CSI-RS in the 5G or NR system, the same RS sequence is supposed to be applied to all CSI-RS ports in a CSI-RS resource. Hence, in the case that multiple CSI-RS ports are transmitted in one OFDM symbol, the same sequence values are repeated, which causes PAPR of the transmitted signal, resulting in an increase in BS implementation and maintenance expenses. Furthermore, the disclosure describes methods of generating and initializing a reference signal sequence in the 5G or NR system in various ways, such as extension of reference signal sequence length, time/frequency resource index modulo operation, combinational adjustment to various input values, sequence initialization based on CDM or antenna port number, etc.

Although the following embodiment of the disclosure will be focused on the LTE or LTE-A system as an example, they may be applied to other communication systems with similar technical backgrounds or channel types. For example, the latter corresponds to a 5G mobile communication technology (5G or NR) developed after LTE-A. More specifically, in the 5G or NR system, a basic structure of the time-frequency domain where signals are transmitted on a downlink and an uplink may be different from in FIGS. 1 and 2. Types of signals to be transmitted on the downlink and uplink may also be different. For example, for the 5G or NR system, compared with the LTE system, additional reference signals such as phase tracking RS (PT-RS), time/frequency tracking RS (TRS), etc., may be supported, and the CSI-RS and the DMRS may also be configured in various forms. Accordingly, embodiments of the disclosure will be equally applied to other communication systems through some modifications to an extent that does not significantly deviate from the scope of the disclosure when judged by those of ordinary skill in the art.

In describing the disclosure, when it is determined that a detailed description of related functions or features may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on the descriptions throughout this specification. In the following description, a base station is an entity for performing allocation of resources to a terminal, and may be at least one of an eNB, a Node B, BS, a radio access unit, a base station controller, or a network node. The terminal may include a user equipment (UE), a mobile station (MS), a cellular phone, a smart phone, a computer, or a multimedia system capable of performing a communication function. Herein, downlink (DL) refers to a radio transmission path for a signal transmitted from a BS to a UE, and uplink (UL) refers to a radio transmission path for a signal transmitted from a UE to a BS.

Data scrambling as hereinafter used includes all kinds of scrambling applied to a bit sequence including information other than a predefined signal such as a reference signal, a sync signal, etc., and may be represented by various terms such as PDSCH scrambling, PUSCH scrambling, PMCH scrambling, etc.

CSI-RS as hereinafter used refers to a reference signal transmitted by a BS for a UE to be able to measure DL channel state information, and with this, the UE may perform various operations such as CSi reporting, beam management, UE mobility related reporting, etc.

SRS as hereinafter used refers to a reference signal transmitted by a UE for a BS to be able to measure UL channel state information, and with this, the BS may perform various operations such as determining a UL beamforming or pre-coding direction and indicating this to the UE.

Demodulation reference signal (DMRS) as hereinafter used refers to a reference signal having characteristics of being subject to UE-specific pre-coding and transmitted for the UE to be able to perform demodulation without receiving additional pre-coding information, and the term is used as intact as referred to as in the LTE system. The term DMRS, however, may be expressed by other names based on a user's intention and a purpose to use the reference signal. For example, it may be expressed by a term like a UE-specific RS or a dedicated RS.

The terms data scrambling/CSI-RS/DMRS/SRS are presented as specific examples to easily explain technical contents of the disclosure and help to understand the disclosure, and it is obvious to those of ordinary skill in the art, to which the disclosure belongs, that the aforementioned operations of the disclosure may be practiced by using the other terms.

In the following embodiment 1 of the disclosure, a CSI-RS sequence initialization method and a signaling method thereof in a 5G or NR system will be described. In embodiment 2 of the disclosure, a DMRS sequence initialization method and a signaling method thereof in a 5G or NR system will be described. In embodiment 3 of the disclosure, a CSI-RS and DMRS sequence initialization method and a signaling method thereof depending on whether the network is synchronous or asynchronous will be described.

Embodiment 1

In the embodiment 1, an initialization method for generating a CSI-RS sequence is described. As for a Rel-15 NR system, a BS and a UE use a sequence generator based on Equations 1 and 5 to generate a sequence, and in this case, the sequence is initialized using Equation 19 in every OFDM symbol.

$$c_{init} = (2^{10} \times ((N_{symb}^{slot} n_{s,f}^\mu + l + 1)(2n_{ID} + 1) + n_{ID})) \bmod 2^{31} \quad \text{[Equation 19]}$$

As described above, in the case of the equation 19, the same sequence value is allocated to multiple CDM groups, having a risk of making the PAPR characteristics of the CSI-RS OFDM symbol deteriorate. One of methods for solving this is to use different sequence initialization for each CDM group in the CSI-RS.

For example, it is possible that the BS and the UE additionally use CDM group index j of the table 4 in the sequence initialization.

Equation 20 is a method of determining a sequence initialization value by adding the CDM group index j to OFDM symbol position l. It has a nature of enabling the CDM groups in an OFDM symbol to use a similar RS sequence with CDM groups of an adjacent OFDM symbol, making it easier to reuse the existing RS sequence cell planning (e.g., in Rel-15) of the BS.

$$c_{init} = (2^{10}((N_{symb}^{slot} n_{s,f}^\mu + l + j + 1)(2n_{ID} + 1) + n_{ID})) \bmod 2^{31} \quad \text{[Equation 20]}$$

Equation 21 is a method of determining a sequence initialization value by multiplying OFDM symbol position l by the CDM group index j. It has an effect of allocating different gaps over time between the sequence initialization values used by the CDM groups in the one OFDM symbol, and may increase randomization of RS interference.

$$c_{init} = (2^{10}(N_{symb}^{slot} n_{s,f}^\mu + l \times j + 1)(2n_{ID} + 1) + n_{ID}) \bmod 2^{31} \quad \text{[Equation 21]}$$

Equation 22 is a method of determining a sequence initialization value by multiplying slot number $n_s$ by the CDM group index j. This has an effect of preventing CDM groups in a slot from using the same sequence initialization value, making it easier to manage reference signal interference.

$$c_{init} = (2^{10}(N_{symb}^{slot} n_{s,f}^\mu + l + 1)(2n_{ID} + 1) + n_{ID}) \bmod 2^{31} \quad \text{[Equation 22]}$$

Equation 23 is a method of determining a sequence initialization value by adding the CDM group index j to scrambling ID term ($2n_{ID}+1$). This has an effect of preventing the CDM groups from using the same sequence initialization value regardless of the time position of a CSI-RS OFDM symbol, making it easier to manage reference signal interference.

$$c_{init} = (2^{10}(N_{symb}^{slot} n_{s,f}^\mu + l + 1)(2n_{ID} + 1 + j) + n_{ID}) \bmod 2^{31} \quad \text{[Equation 23]}$$

Equation 24 is a method of determining a sequence initialization value by adding the CDM group index j to a Rel-15 sequence initialization value. It has a nature of enabling the CDM groups in an OFDM symbol to use successive sequence initialization, making it easier to reuse the existing RS sequence cell planning (e.g., in Rel-15) of the BS.

$$c_{init} = (2^{10}(N_{symb}^{slot} n_{s,f}^\mu + l + 1)(2n_{ID} + 1) + n_{ID} + j) \bmod 2^{31} \quad \text{[Equation 24]}$$

Equations 20 to 24 are examples to help understand the embodiment 1, and they are not limited thereto in practice but there may be a similar method to be used.

In the meantime, a method of one of Equations 20 to 24 may not be solely used but may be used with Equation 19 for backward compatibility. For example, the UE may report the BS whether the UE is able to support only sequence initialization based on the equation 19 or also the initialization method based on one of Equations 20 to 24 in addition to Equation 19, by UE capability signaling. Based on this, the BS may indicate to the UE that is able to use the initialization method based on one of Equations 20 to 24 whether the initialization method based on Equation 19 or the initialization method based on one of Equations 20 to 24 is used, by higher layer signaling. In this case, when there is no higher layer signaling for the sequence initialization selection, the UE may be arranged to assume (use) the sequence initialization based on Equation 19 as default.

Similar to this, the BS may also indicate to the UE whether the sequence initialization based on Equation 19 or the initialization method based on one of Equation 20 to 24 apart from Equation 19 is used, by using one bit included in DCI.

Although methods in which Equations 20 to 24 use the CDM group index j in a CSI-RS resource have been described, they are not limited thereto and may be variously modified.

For example, in terms of one CSI-RS resource, 'j' in Equations 20 to 24 may be modified to 'j mod 4' given that a maximum of 4 CDM groups may be transmitted in one OFDM symbol. This may prevent generation of unnecessarily many sequences when there are many CDM groups in one CSI-RS resource as in a case that CDM-2 is configured for 32-port CSI-RS and there are 16 CDM groups.

In another example, the CDM group index 'j' in Equations 20 to 24 may be substituted with CSI-RS port index 'p'. The p may use one of values {3000, 3001, ..., 3000+P−1} or one of values {0, 1, ..., P−1} when there are a total of P ports in the corresponding CSI-RS resource. This may allow different sequences to be used for each CSI-RS port even in a CDM group, further improving interference randomization performance.

Given that a maximum of 8 CSI-RS ports may be transmitted in one OFDM symbol in terms of one CSI-RS resource, 'j' in Equations 20 to 24 may be modified to 'p mod 8'. The p is the CSI-RS port index in a CSI-RS resource, and may use one of values {3000, 3001, ..., 3000+P−1} or one of values {0, 1, ..., P−1} when there are a total of P ports in the corresponding CSI-RS resource. Modifying 'j' to 'p mod 4' may prevent generation of unnecessarily many sequences when there are many ports in a CSI-RS resource as for 32-port CSI-RS.

Embodiment 2

In the embodiment 2, an initialization method for generating a DMRS sequence is described. As for a Rel-15 NR system, a BS and a UE use a sequence generator based on Equations 1 and 5 to generate a sequence, and in this case, the sequence is initialized using Equation 25 below in every OFDM symbol.

$$c_{init}=(2^{17}\times((N_{symb}^{slot}n_{s,f}^{\mu}+l+1)(2n_{ID}^{nSCID}+1))+2N_{ID}^{nSCID}+n_{SCID}) \mod 2^{31}$$ [Equation 25]

Similar to the case of CSI-RS, in the case of Equation 25, the same sequence value is allocated to multiple DMRS ports, having a risk of making the PAPR characteristics of the DMRS OFDM symbol deteriorate. One of methods for solving this is to use different sequence initialization for each DMRS port (or each DMRS CDM group).

For example, the BS and the UE may additionally use 1) DMRS port number (e.g., 1000, 1001, . . . , 1011), 2) allocated DMRS port order p, or 3) DMRS CDM group number (e.g., 0, 1, 2, . . . ) for sequence initialization. The method 1) or 3) uses fixed sequence initialization according to an actual DMRS port number regardless of DMRS allocation and thus has an advantage in facilitating interference management prediction, and the method 2) has an advantage in minimizing a change in sequence initialization by taking into account that a UE is allocated a limited number of DMRS ports. For convenience of explanation, DMRS index in the methods 1), 2), or 3) will now be all unitedly denoted by 'p'.

Equation 20 is a method of determining a sequence initialization value by adding the DMRS port index p to the OFDM symbol position l. It has a nature of enabling the DMRS ports in an OFDM symbol to use a similar RS sequence with DMRS ports of an adjacent OFDM symbol, making it easier to reuse the existing RS sequence cell planning (e.g., in Rel-15) of the BS.

$$c_{init}=(2^{17}(N_{symb}^{slot}n_{s,f}^{\mu}+l+p+1)(2N_{ID}^{nSCID}+1)+2N_{ID}^{nSCID}+n_{SCID}) \mod 2^{31}$$ [Equation 26]

Equation 21 is a method of determining a sequence initialization value by multiplying the OFDM symbol position l by the DMRS port index p. It has an effect of allocating different gaps over time between the sequence initialization values used by the DMRS ports in the one OFDM symbol, and may increase randomization of RS interference.

$$c_{init}=(2^{17}(N_{symb}^{slot}n_{s,f}^{\mu}+l\times p+1)(2N_{ID}^{nSCID}+1)+2N_{ID}^{nSCID}+n_{SCID}) \mod 2^{31}$$ [Equation 27]

Equation 22 is a method of determining a sequence initialization value by multiplying slot number $n_s$, by the DMRS port index p. This has an effect of preventing DMRS ports in a slot from using the same sequence initialization value, making it easier to manage reference signal interference.

$$c_{init}=(2^{17}(N_{symb}^{slot}n_{s,f}^{\mu}+l+1)(2N_{ID}^{nSCID}+1)+2N_{ID}^{nSCID}+n_{SCID}) \mod 2^{31}$$ [Equation 28]

Equation 23 is a method of determining a sequence initialization value by adding the DMRS port index p to scrambling ID term ($2n_{ID}$+1). This has an effect of preventing the DMRS ports from using the same sequence initialization value regardless of the time position of a DMRS OFDM symbol, making it easier to manage reference signal interference.

$$c_{init}=(2^{17}(N_{symb}^{slot}n_{s,f}^{\mu}+l+1)(2N_{ID}^{nSCID}+1+p)+2N_{ID}^{nSCID}+n_{SCID}) \mod 2^{31}$$ [Equation 29]

Equation 24 is a method of determining a sequence initialization value by adding the DMRS port index p to a Rel-15 sequence initialization value. It has a nature of enabling the DMRS ports in an OFDM symbol to use successive sequence initialization, making it easier to reuse the existing RS sequence cell planning (e.g., in Rel-15) of the BS.

$$c_{init}=(2^{17}(N_{symb}^{slot}n_{s,f}^{\mu}+l+1)(2N_{ID}^{nSCID}+1)+2N_{ID}^{nSCID}+n_{SCID}+p) \mod 2^{31}$$ [Equation 30]

Equations 26 to 30 are examples to help understand the embodiment 2, and they are not limited thereto in practice but there may be a similar method to be used.

In the meantime, a method of one of Equations 26 to 30 may be used not alone but along with Equation 25 for backward compatibility. For example, the UE may report the BS whether the UE is able to support only sequence initialization based on Equation 25 or also the initialization method based on one of Equations 26 to 30 in addition to Equation 25, by UE capability signaling. Based on this, the BS may indicate to the UE that is able to use the initialization method based on one of Equations 26 to 30 whether the initialization method based on Equation 25 or the initialization method based on one of Equations 26 to 30 is used, by higher layer signaling. In this case, when there is no higher layer signaling for the sequence initialization selection, the UE may be arranged to assume (use) the sequence initialization based on Equation 25 as default.

Similar to this, the BS may also indicate to the UE whether the sequence initialization based on Equation 19 or the initialization method based on one of Equation 20 to 24 apart from Equation 19 is used, by using one bit included in DCI. In this case, the UE may be guaranteed to use only sequence initialization based on the equation 19 only for a PDSCH or a PUSCH scheduled by DCI format 0_0 or 0_1 of fallback mode.

Embodiment 3

In the embodiment 3, an initialization method for generating a CSI-RS sequence is described.

One of major purposes of the channel status information reference signal (CSI-RS) is to measure mobility of the UE, in which case the UE may measure CSI-RSs transmitted not only from its serving cell but also from neighboring cells.

When a CSI-RS sequence is initialized based on $n_s$ that is not repeated in a frame, the UE hardly figures out correct values of the CSI-RS sequence until decoding a physical broadcast channel (PBCH) of a neighboring cell. However, when the CSI-RS sequence is repeated every 5 ms unit, i.e., every half frame unit, the UE may correctly figure out the CSI-RS sequence only by receiving a PBCH demodulation reference signal (DMRS) that transmits three least significant bits (LSBs) of an SS/PBCH block index, and has an advantage (effect) of avoiding decoding of a PBCH of a neighboring cell.

For this, sequence generation and initialization may be used, which will be described with reference to Equation 31 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 31]

$$m = 0, 1, \ldots, M \cdot N_{RB}^{max,DL} - 1$$

In Equation 31, M may be 1) the number of CSI-RS ports included in a CSI-RS CDM group, 2) the number of CSI-RS ports included in a CSI-RS resource, or 3) a CSI-RS RE density configured by a higher layer.

For example, in the case of M being 1), M may be configured up to 8 by a higher layer, and in another example where M is 2), M may be configured up to 32 by a higher layer. This is to generate a gold sequence output having a long length for a CDM group or a CSI-RS resource and suitably split it for each port for use.

System bandwidth $N_{RB}^{max,DL}$ is used in Equation 31, but it may be changed to another value such as bandwidth of a BWP configured and allocated for the UE or maximum bandwidth configured for the UE. In this case, to share the same sequence between UEs allocated BWPs of different bands, the BS and the UE may set (agree) to first generate a sequence based on system bandwidth (or $N_{RB}^{max,DL}$) (i.e., generate a sequence based on an absolute index of a PRB) and use only a sequence among the generated sequence, which corresponds to the allocated band (i.e., a band of an activated BWP) in actual transmission.

In the aforementioned embodiment, system bandwidth information may be notified to the UE in various methods, e.g., the UE may be aware of a beginning portion (or ending portion) of the system bandwidth through a frequency offset value set based on the lowest (or the highest) synchronization signal (SS) band.

$$c_{init}=2^{10}\times((14n_{s,f}^{\mu}+l+1)(2N_{ID}^{CSI}+1)+N_{ID}^{CSI})$$ [Equation 32]

When the sequence initialization method similar to that of the LTE system as in Equation 32 is used as it is, $n_{s,f}^{\mu}$ increases according to subcarrier spacing (SCS, which may be represented by other various terms such as numerology) as represented in Tables 3 and 4, and thus the available number of cases of Cinit may exceed $2^{31}$ (in the equation 32, $n_{s,f}^{\mu}$ is a slot number within a frame, l is an OFDM symbol number within a slot, and $N_{ID}^{CSI}$ is a CSI-RS ID (scrambling ID) configured by a higher layer).

To prevent this, a modulo operation as in Equation 33 below is used.

$$c_{init}=(2^{10}\times((14n_{s,f}^{\mu}+l+1)(2N_{ID}^{SCI}+1)+N_{ID}^{CSI})) \bmod 2^{31}$$ [Equation 33]

In Equation 33, $n_{s,f}^{\mu}$ is a slot number within a frame, l is an OFDM symbol number within a slot, and $N_{ID}^{CSI}$ is a CSI-RS ID (scrambling ID) configured by a higher layer. Referring to Equation 33, the UE needs to correctly know of $n_{s,f}^{\mu}$ to receive a CSI-RS, but the UE may not be able to know $n_{s,f}^{\mu}$ in a case of an asynchronous network. Accordingly, modifications as in Equation 34 may be considered.

$$c_{init}=(2^{10}\times(((14(n_{s,f}^{\mu} \bmod \{N_{slot}^{frame,\mu}/M\}))+l+1) (2N_{ID}^{CSI}+1)+N_{ID}^{CSI})) \bmod 2^{31}$$ [Equation 33]

In Equation 34, $n_{s,f}^{\mu}$ is a slot number within a frame, l is an OFDM symbol number within a slot, $N_{ID}^{CSI}$ is a CSI-RS ID (scrambling ID) configured by a higher layer to be one of values $0 \sim (2^{10}-1)$, and $N_{slot}^{frame,\mu}$ is the number of slots in a frame, which is determined based on SCS as in Table 4. Furthermore, in Equation 34, M is a variable for adjusting a sequence initialization repetition cycle, which may be 1) defined as a fixed value, 2) set to a value configured by a higher layer, 3) implicitly changed according to another parameter, or 4) implicitly changed according to a purpose of the reference signal (RS).

In an embodiment, {M=10/sequence repetition cycle [ms]} is a classic example of defining M as a fixed value. In this case, M may be defined to be 2 for 5 ms repetition or 10 for 1 ms repetition.

In another embodiment, a value of M may be indicated by higher layer signaling as one of several candidate values. For example, the BS may indicate that the UE is to use one of the values {1, 2, 10} or {1, 2, 5, 10} as M.

When M is arranged to be a value changing according to another parameter, M may be changed according to such a parameter as an SCS value μ. For example, in a case of μ=0 or 1, i.e., SCS=15 kHz or 30 kHz, M=10 and the sequence may be repeated every 1 ms, or in a case of μ=2, or 3, or 4, i.e., SCS=60 kHz or 120 kHz or 240 kHz, M=2 and the sequence may be repeated every 5 ms. This comes from a consideration that, with a large SCS value, i.e., in a high frequency band, 5 ms boundary information may be known based on a PBCH DMRS, but with a small SCS value, i.e., in a low frequency band, it is difficult to obtain timing information based on the PBCH DMRS. It is to be noted that values of M depending on a value μ are examples, and they may be mapped to different values in a real application.

In another embodiment, M may be determined according to a purpose of the RS. For example, when a CSI-RS is configured for tracking (or higher layer parameter TRS-INFO of the CSI-RS is set to 'ON'), when a CSI-RS is configured for beam management (or for L1-RSRP reporting/computation), and/or when a CSI-RS is configured for CSI acquisition (or the CSI-RS is associated to one or more reporting settings), the UE may use 10 ms sequence initialization cycle by assuming M=1. In another example, when a CSI-RS is configured for mobility, the UE may use 5 ms sequence initialization cycle by assuming M=2. That a CSI-RS is configured for mobility corresponds to one of various conditions in which, e.g., 1) the CSI-RS is associated/connected by higher layer parameter RLM-CSI RS, 2) the CSI-RS is configured by higher layer parameter CSI-RS-ResourceConfig-Mobility or CSI-RS-Resource-Mobility, or 3) higher layer parameter useServingCellTiming is configured to be disabled or off to prevent serving cell timing from being used for measuring SS and RS of a neighboring cell.

In the meantime, the aforementioned mapping of M values for each purpose of the RS is an example, and may be obvious to be changed/applied in system application. Furthermore, although the aforementioned embodiments were individually described above for convenience of explanation, they are not mutually exclusive and two or more of the embodiments may be applied together. For example, M may be changed according to an SCS value and may also be determined by being affected by a purpose of the RS.

In an embodiment, when a CSI-RS is configured for tracking, when a CSI-RS is configured for beam management, or when a CSI-RS is configured for CSI acquisition, the UE may assume M=1 and use 10 ms sequence initialization cycle (M may be changed depending on to a purpose of the RS). In another embodiment, when a CSI-RS is configured for mobility, the UE may determine M according to a SCS value applied to the CSI-RS (e.g., with μ=0 or 1, i.e., SCS=15 kHz or 30 kHz, M=10 and the sequence may be repeated every 1 ms, or with μ=2, or 3, or 4, i.e., SCS=60 kHz or 120 kHz, M=2 and the sequence may be repeated every 5 ms).

Using Equation 34, the UE may receive a CSI-RS of another cell without decoding a PBCH of the other cell (or based on $n_{s,f}^{\mu}$ of the current cell without $n_{s,f}^{\mu}$ information of the neighboring cell) even in an asynchronous network (e.g., in a case that higher layer parameter useServingCellTiming is configured to be disabled or off, so serving cell timing may not be used for measuring SS and RS of a neighboring cell).

The BS may use a method of generating an additional CSI-RS sequence similar to Equation 34 in addition to the method of generating a CSI-RS sequence based on Equation 33, and may notify the UE of what method of generating a CSI-RS sequence is used.

When two or more methods of generating a CSI-RS sequence are supported, the BS may notify the UE of what method of generating a CSI-RS sequence is used by 1) explicitly indicating the method of generating a CSI-RS sequence selected by higher layer signaling such as RRC signaling, 2) implicitly determining the method of generating a CSI-RS sequence depending on the PDSCH transmission type, or 3) implicitly determining the method of generating a CSI-RS sequence depending on a purpose of the RS.

In the case of indicating the method of generating a CSI-RS sequence by RRC signaling, it is obvious that the BS may indicate a method of generating a single CSI-RS sequence for all the physical downlink shared channels (PDSCHs) but also indicate a method of generating a different CSI-RS sequence for each PDSCH transmission type by extending the former method. It is noted that the PDSCH transmission type may be used in various senses, such as identification based on slot-based scheduling (14 OFDM symbol based scheduling) or non-slot-based scheduling (2-/4-/7-OFDM symbol based scheduling), identification based on service type such as eMBB/mMTC/URLLC/LAA, classification by RNTI type applied to the corresponding PDSCH such as C-RNTI/P-RNTI/SI-RNTI, identification based on synchronous network (in a case that the higher layer parameter useServingCellTiming is configured to be enabled or on, enabling serving cell timing to be used for measuring SS and RS of a neighboring cell) or asynchronous network (in a case that the higher layer parameter useServingCellTiming is configured to be disabled or off, disabling the serving cell timing to be used for measuring SS and RS of a neighboring cell), etc.

For example, in the case of the synchronous network (in the case that the higher layer parameter useServingCellTiming is configured to be enabled or on, enabling serving cell timing to be used for measuring SS and RS of a neighboring cell), Equation 33 may be applied all the CSI-RSs, but in the case of asynchronous network (in a case that the higher layer parameter useServingCellTiming is configured to be disabled or off, disabling the serving cell timing to be used for measuring SS and RS of a neighboring cell), Equation 33 may be applied to a CSI-RS for CSI acquisition/beam management/time-frequency tracking and another method similar to Equation 34 having a sequence generation repetition cycle of 5 ms may be applied to a CSI-RS for mobility (i.e., a CSI-RS from another cell to support L3 mobility), to facilitate mobility RS reception of the UE.

Of the aforementioned embodiments, the embodiment related to indicating the sequence generation method by higher layer signaling includes a method of providing the UE with one or more subframe numbers (SFNs) or one or more SFN offsets by higher layer signaling. For example, the UE may apply $n_{s,f1}^{\mu}$ in Equation 35 below to a CSI-RS for CSI acquisition/beam management/time-frequency tracking and apply $n_{s,f2}^{\mu}$ to a CSI-RS for mobility, based on the subframe number (SFN) or one or more SFN offsets.

$$c_{init} = \begin{cases} (2^{10} \times ((14 n_{s,f1}^{\mu} + l + 1)(2N_{ID}^{CSI} + 1) + N_{ID}^{cCSI})) \bmod 2^{31} \\ (2^{10} \times ((14 n_{s,f2}^{\mu} + l + 1)(2N_{ID}^{CSI} + 1) + N_{ID}^{cCSI})) \bmod 2^{31} \end{cases}$$ [Equation 35]

Embodiment 4

In the embodiment 4, another example of the initialization method for generating a DMRS sequence is described. As for a Rel-15 NR system, a BS and a UE use a sequence generator based on Equations 1 and 5 to generate a sequence, and in this case, the sequence may be initialized using Equation 36 below in every OFDM symbol.

$$c_{init} = (2^{17} \times ((N_{symb}^{slot} n_{s,f}^{\mu} + l + 1)(2N_{ID}^{nSCID} + 1)) + 2N_{ID}^{nSCID} + n_{SCID}) \bmod 2^{31}$$ [Equation 36]

In the case of Equation 36, the same sequence value is allocated to multiple DMRS ports, having a risk of making the PAPR characteristics of the DMRS OFDM symbol deteriorate. One of methods for solving this is to use different sequence initialization for each DMRS CDM group.

For example, the BS and the UE may additionally use a DMRS CDM group number (e.g., 0, 1, 2, . . . ) for sequence initialization. As for the DMRS, depending on the type specified by a higher layer, a maximum of two DMRS CDM groups (CDM group #0, CDM group #1) may exist in one DMRS OFDM symbol for DMRS type 1, and a maximum of three DMRS CDM groups (CDM group #0, CDM group #1, CDM group #2) may exist for DMRS type 2. For example, through DMRS configuration information specified by a higher layer, the BS and the UE may determine whether to use the DMRS group number for sequence initialization of CDM group #0, CDM group #1, CDM group #2.

In an embodiment, the BS may indicate by higher layer signaling whether the UE is to use a DMRS CDM group number (e.g., 0, 1, 2, . . . ) for sequence initialization. In this case, the UE may be arranged to use only the sequence initialization that is not based on the CDM group number regardless of the signaling of whether to use the DMRS CDM group number based sequence initialization for a PUSCH or PDSCH scheduled in DCI format 0_0 or 1_0 of a fallback mode and determine whether to use sequence initialization that uses the CDM group number (e.g., 0, 1, 2, . . . ) based on signaling of whether to use the DMRS CDM group number based sequence initialization for a PUSCH or PDSCH scheduled in a DCI format of non-fallback mode (e.g., DCI format 0_1 or 1_1).

TABLE 6

Table 7.4.1.1.2-1: Parameters for PDSCH DM-RS configuration type 1.

| | | | wf(k') | | wt(l') | |
| --- | --- | --- | --- | --- | --- | --- |
| p | CDM group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Table 7.4.1.1.2-2: Parameters for PDSCH DM-RS configuration type 2.

| | | | wf(k') | | wt(l') | |
| --- | --- | --- | --- | --- | --- | --- |
| p | CDM group λ | Δ | k' = 0 | k' = 1 | l' = 0 | l' = 0 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |

TABLE 6-continued

| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Referring to Equation 36, the BS may allocate, through a higher layer, two virtual cell IDs ($N_{ID}^{n_{SCID}=0}$ and $N_{ID}^{n_{SCID}=1}$) and indicate one bit $n_{SCID}$ (0 or 1) in DCI for the UE to dynamically select one of the two virtual cell IDs. This is to dynamically change not only DMRS port allocation but also sequence scrambling while MU MIMO is performed or cooperative multi point operation (CoMP), multi-TRP is performed through multiple BSs.

In this case, as for type 1 DMRS (DMRS configuration type 1), it is possible to distribute two virtual cell IDs configured by a higher layer to CDM groups one for each, given that there are a maximum of two DMRS CDM groups that may be allocated to the UE. For example, a first virtual cell ID ($N_{ID}^{n_{SCID}=0}$) may be allocated to a first CDM group (CDM group #0), and a second virtual cell ID ($N_{ID}^{n_{SCID}=1}$) may be allocated to a second CDM group (CDM group #1). This means that DMRS ports 1000, 1001, 1004, 1005 that belong to the first CDM group use the same c_init as in Equation 37 and DMRS ports 1002, 1003, 1006, 1007 that belong to the second CDM group use the same c_init as in equation 38.

$$c_{init}=(2^{17}\times((N_{symb}^{slot}n_{s,f}^{\mu}+l+1)(2n_{ID}^{\lambda=0}+1))+2N_{ID}^{\lambda=0}+n_{SCID})\bmod 2^{31} \quad \text{[Equation 37]}$$

$$c_{init}=(2^{17}\times((N_{symb}^{slot}n_{s,f}^{\mu}+l+1)(2n_{ID}^{\lambda=1}+1))+2N_{ID}^{\lambda=1}+n_{SCID})\bmod 2^{31} \quad \text{[Equation 38]}$$

In Equations 37 and 38, λ denotes a CDM group index, the symbol remaining intact in the following description. Equations 37 and 38 may be expressed in a single equation as in Equation 39.

$$c_{init}=(2^{17}\times((N_{symb}^{slot}n_{s,f}^{\mu}+l+1)(2n_{ID}^{\lambda}+1))+2N_{ID}^{\lambda}+n_{SCID})\bmod 2^{31} \quad \text{[Equation 37]}$$

In a case of generating a DMRS sequence according to Equation 37 and 38 or 39, there may be a disadvantage that the effect of changing the sequence based on $n_{SCID}$ in DCI weakens. To address this, modifications such as changing mapping between CDM groups and virtual cell IDs depending on $n_{SCID}$ values may be made. For example, when $n_{SCID}=0$ is indicated, the BS and the UE may be arranged to map a first virtual cell ID ($N_{ID}^{n_{SCID}=0}$) to the CDM group #0 and a second virtual cell ID ($N_{ID}^{n_{SCID}=1}$) to the CDM group #1, and when $n_{SCID}=1$ is indicated, the BS and the UE may be arranged to map the second virtual cell ID ($N_{ID}^{n_{SCID}=1}$) to the CDM group #0 and the first virtual cell ID ($N_{ID}^{n_{SCID}=0}$) to the CDM group #1.

This means that 1) when $n_{SCID}=0$, DMRS ports 1000, 1001, 1004, 1005 that belong to the first CDM group use the same c_init as in Equation 40 and 2) when $n_{SCID}=0$, DMRS ports 1002, 1003, 1006, 1007 that belong to the second CDM group use the same c_init as in Equation 41, 3) when $n_{SCID}=1$, the DMRS ports 1000, 1001, 1004, 1005 that belong to the first CDM group use the same c_init as in Equation 42 and 4) when $n_{SCID}=1$, the DMRS ports 1002, 1003, 1006, 1007 that belong to the second CDM group use the same c_init as in Equation 43.

$$c_{init}=(2^{17}\times((N_{symb}^{slot}n_{s,f}^{\mu}+l+1)(2n_{ID}^{0}+1))+2N_{ID}^{0}+n_{SCID})\bmod 2^{31} \quad \text{[Equation 40]}$$

$$c_{init}=(2^{17}\times((N_{symb}^{slot}n_{s,f}^{\mu}+l+1)(2n_{ID}^{1}+1))+2N_{ID}^{1}+n_{SCID})\bmod 2^{31} \quad \text{[Equation 41]}$$

$$c_{init}=(2^{17}\times((N_{symb}^{slot}n_{s,f}^{\mu}+l+1)(2n_{ID}^{1}+1))+2N_{ID}^{1}+n_{SCID})\bmod 2^{31} \quad \text{[Equation 42]}$$

$$c_{init}=(2^{17}\times((N_{symb}^{slot}n_{s,f}^{\mu}+l+1)(2n_{ID}^{0}+1))+2N_{ID}^{0}+n_{SCID})\bmod 2^{31} \quad \text{[Equation 43]}$$

Equations 40 and 43 may be expressed in a single equation as in Equation 44.

$$c_{init}=(2^{17}\times((N_{symb}^{slot}n_{s,f}^{\mu}+l+1)(2n_{ID}^{(3n+\lambda)\bmod 2}+1))+2N_{ID}^{(3n+\lambda)\bmod 2}+n_{SCID})\bmod 2^{31} \quad \text{[Equation 44]}$$

In Equation 44, (3n+λ)mod 2 is a portion that requires modifications depending on a maximum number of CDM groups, i.e., a DMRS type, which may be expressed like ((w+1)n+λ)mod w, where w=2 for DMRS configuration type 1.

For type 2 DMRS, the examples of Equations 37 to 44 may extend as follows:

In a first method, a total of six virtual cell IDs are configured through a higher layer to enable selection of two virtual cell IDs for each CDM group of a maximum of three CMD groups. In this case, the six virtual cell IDs may include two virtual cell IDs that are pre-configured for a Release 15 DMRS. In an embodiment, the BS may configure the UE with 1) additional six virtual cell IDs apart from the two virtual cell IDs for the release 15 DMRS, or with 2) additional four virtual cell IDs by reusing the two virtual cell IDs for the release 15 DMRS. For example, let the six virtual cell IDs represented by $\{N_{ID}^{0}, N_{ID}^{1}, N_{ID}^{2}, N_{ID}^{3}, N_{ID}^{4}, N_{ID}^{5}\}$, when the BS indicates $n_{SCID}=0$ in DCI, the UE may interpret it as generating a sequence by allocating the first three virtual cell IDs $N_{ID}^{0}, N_{ID}^{1}, N_{ID}^{2}$ to the CDM groups #0, #1, #2, respectively, and when the BS indicates $n_{SCID}=1$, the UE may interpret it as generating a sequence by allocating the last three virtual cell IDs $N_{ID}^{3}, N_{ID}^{4}, N_{ID}^{5}$ to the CDM groups #0, #1, #2, respectively. Mathematical expressions of this embodiment are similar to the examples of Equations 37 to 44, so the expressions will be omitted.

A second method is to apply an extended DMRS type 1 method, in which case the same scheme as for DMRS type 1 is applied for the first two CDM groups #0, #1, but additional two virtual cell IDs are configured and one of them is selected according to a value of $n_{SCID}$ for the third CDMS group #2. In an embodiment, the BS may configure the UE with a total of four virtual cell IDs including two virtual cell IDs for the release 15 DMRS ($N_{ID}^{0}, N_{ID}^{1}$) and two virtual cell IDs used for the CDM group #2 ($N_{ID}^{2}, N_{ID}^{3}$). For example, when $n_{SCID}=0$ is indicated, the BS and the UE may be arranged to map a first virtual cell ID ($N_{ID}^{0}$) to the CDM group #0, a second virtual cell ID ($N_{ID}^{1}$) to the CDM group #1, and a third virtual cell ID ($N_{ID}^{2}$) to the CDM group #2, and when $n_{SCID}=1$ is indicated, the BS and the UE may be arranged to map the second virtual cell ID ($N_{ID}^{1}$) to the CDM group #0, the first virtual cell ID ($N_{ID}^{0}$) to the CDM group #1, and the fourth virtual cell ID ($N_{ID}^{3}$) to the CDM group #2. Mathematical expressions of this embodiment are similar to the examples of Equations 37 to 44, so the expressions will be omitted.

A third method is yet another example of extending the DMRS type 1 method, in which case a total of three virtual cell IDs are configured and order of mapping of the virtual cell IDs to the CMD groups #0, #2, and #3 according to the value of $n_{SCID}$ is determined. In an embodiment, the BS may configure the UE with a total of three virtual cell IDs including two virtual cell IDs for the release 15 DMRS ($N_{ID}^{0}, N_{ID}^{1}$) and an additional virtual cell ID ($N_{ID}^{2}$). For example, when $n_{SCID}=0$ is indicated, the BS and the UE may be arranged to map a first virtual cell ID ($N_{ID}^{0}$) to the CDM group #0, a second virtual cell ID ($N_{ID}^1$) to the CDM group #1, and a third virtual cell ID ($N_{ID}^2$) to the CDM group #2, and when $n_{SCID}=1$ is indicated, the BS and the UE may be arranged to cyclic-shift the above virtual cell ID mapping one by one to map the second virtual cell ID ($N_{ID}^1$) to the CDM group #0, the third virtual cell ID ($N_{ID}^2$) to the CDM group #1, and the first virtual cell ID ($N_{ID}^0$) to the CDM group #2. An example of a mathematical expression of the embodiment is as in Equation 45.

$$c_{init} = (2^{17} \times ((N_{symb}^{slot} n_{s,f}^\mu + l + 1)(2n_{ID}^{(4n+\lambda) \bmod 3} + 1)) + 2N_{ID}^{(4n+\lambda) \bmod 3} + n_{SCID}) \bmod 2^{31}$$ [Equation 45]

In Equation 45, $(4n+\lambda) \bmod 3$ is a portion that requires modifications depending on a maximum number of CDM groups, i.e., a DMRS type, which may be expressed like $((w+1)n+\lambda) \bmod w$, where w=3 for DMRS configuration type 2.

Referring to the aforementioned embodiments, Equation 46 is considered as an integrated solution for the DMRS configuration types 1 and 2.

$$c_{init} = \left(2^{17} \times \left((N_{symb}^{slot} n_{s,f}^\mu + l + 1)(2N_{ID}^{((w+1)n+\lambda) \bmod w} + 1)\right) + 2N_{ID}^{((w+1)n+\lambda) \bmod w} + n_{SCID}\right) \bmod 2^{31},$$

where $\begin{cases} w = 2 \text{ for } DMRS \text{ configuration type 1} \\ w = 3 \text{ for } DMRS \text{ configuration type 2} \end{cases}$

[Equation 46]

Figure 5:
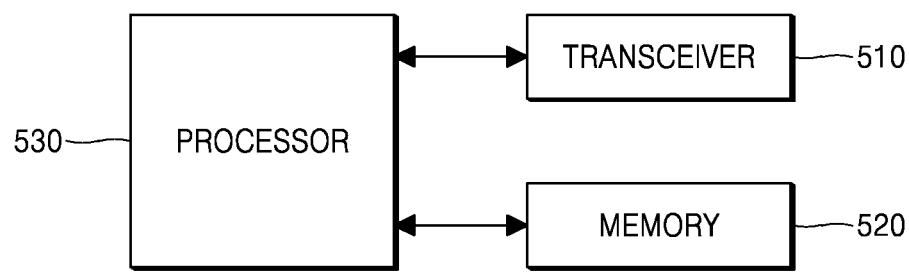
FIG. 5 is a block diagram illustrating a structure of a base station (BS), according to an embodiment.

FIG. 5 is a block diagram illustrating a structure of a BS, according to an embodiment.

As shown in FIG. 5, a BS in accordance with an embodiment may include a transceiver 510, a memory 520, and a processor 530. The transceiver 510, the memory 520, and the processor 530 of the BS may operate according to the aforementioned communication method of the BS. Components of the BS are not, however, limited thereto. For example, the BS may include more or fewer elements than described above. In addition, the transceiver 510, the memory 520, and the processor 530 may be implemented in a single chip. The processor 530 may include at least one or more processors.

The transceiver 510 is a collective term of a BS transmitter and a BS receiver, and may transmit or receive a signal to or from a UE. The signals to be transmitted to or received from the UE may include control information and data. The transceiver 510 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 510 are not limited to the RF transmitter and RF receiver.

In addition, the transceiver may receive a signal on a wireless channel and output the signal to the processor 530, or transmit a signal output from the processor 530 on a wireless channel.

The memory 520 may store a program and data required for an operation of the BS. Furthermore, the memory 520 may store control information or data included in a signal obtained by the BS. The memory 520 may include a storage medium such as a read only memory (ROM), a random access memory (RAM), a hard disk, a compact disk ROM (CD-ROM), and a digital versatile disc (DVD), or a combination of storage mediums.

The processor 530 may control a series of processes for the BS to be operated according to the embodiments of the disclosure. For example, the transceiver 510 may receive a data signal including a control signal transmitted by the UE, and the processor 530 may determine a result of receiving the control signal and the data signal transmitted by the UE. In an embodiment, the processor 530 may control to determine a structure of a reference signal, generate configuration information of the reference signal to be forwarded to the UE, generate a channel state information reference signal (CSI-RS) or demodulation reference signal (DMRS) sequence based on the configuration information, and transmit the CSI-RS or DMRS to the UE.

Figure 6:
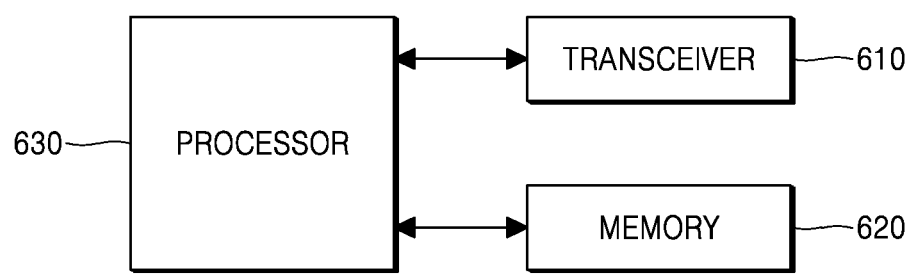
FIG. 6 is a block diagram illustrating a structure of a user equipment (UE), according to an embodiment.

FIG. 6 is a block diagram illustrating a structure of a UE, according to an embodiment.

Referring to FIG. 6, the UE in the disclosure may include a transceiver 610, a memory 620, and a processor 630. The transceiver 610, the memory 620, and the processor 630 of the UE may operate according to the aforementioned communication method of the UE. Components of the UE are not, however, limited thereto. For example, the UE may include more or fewer elements than described above. In addition, the transceiver 610, the memory 620, and the processor 630 may be implemented in a single chip. The processor 630 may include at least one or more processors.

The transceiver 610 is a collective term of a UE transmitter and a UE receiver, and may transmit or receive a signal to or from a base station. The signals to be transmitted to or received from the BS may include control information and data. For this, the transceiver 610 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 610 are not limited to the RF transmitter and RF receiver.

In addition, the transceiver 610 may receive a signal on a wireless channel and output the signal to the processor 630, or transmit a signal output from the processor 630 on a wireless channel.

The memory 620 may store a program and data required for operation of the BS. Furthermore, the memory 620 may store control information or data included in a signal obtained by the UE. The memory 620 may include a storage medium such as a ROM, a RAM, a hard disk, a CD-ROM, and a DVD, or a combination of the storage mediums.

The processor 630 may control a series of processes for the UE to be operated according to the embodiments of the disclosure. For example, the transceiver 610 may receive a data signal including a control signal, and the processor 630 may determine a result of receiving the data signal. In an embodiment, the processor 630 may control to receive a reference signal from a BS and interpret how to apply the reference signal. Furthermore, it may control the transceiver 610 to transmit the reference signal.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a LAN, a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those ordinary skilled in the art that the disclosure is not limited to the embodiments of the disclosure described, which have been provided only for illustrative purposes. Furthermore, the embodiments may be operated by being combined with one another as needed. For example, an embodiment and some of another embodiment of the disclosure may be combined together. Although the embodiments are proposed based on an LTE system, a 5G or NR system, etc., modifications to the embodiments may be made within the scope of the disclosure.

The invention claimed is:

1. A method, performed by a user equipment (UE), of transmitting or receiving signals in a wireless communication system, the method comprising:
   transmitting, to a base station (BS), UE capability information regarding sequence initialization of a demodulation reference signal (DMRS);
   receiving, from the BS, DMRS configuration information determined based on the UE capability information; and
   receiving the DMRS from the BS based on the DMRS configuration information,
   wherein the DMRS is generated based on a sequence initialization parameter, $c_{init}$,
   wherein the sequence initialization parameter, $c_{init}$, is determined based $(2^{17} \times ((N_{symb}^{slot} n_{s,f}^{\mu} + l + 1)(2N_{ID}^{\lambda} + 1)) + 2N_{ID}^{\lambda} + n_{SCID}) \mod 2^-$, a number of symbols per slot, $N_{symb}^{slot}$, a slot number within a frame, $n_{s,f}^{\mu}$, a symbol number within a slot, l, a code division multiplexing (CDM) group identifier, $\lambda$, a virtual cell identifier, $N_{ID}^{\lambda}$, and a value indicated by downlink control information, $n_{SCID}$, and
   wherein the CDM group identifier, $\lambda$, is included in the DMRS configuration information.

2. The method of claim 1, wherein the sequence initialization parameter of each of different CDM group identifiers determined to have the same $n_{SCID}$ has a different value based on the CDM group identifier.

3. The method of claim 1, wherein the sequence initialization parameter determined based on the CDM group identifier is applied to both DMRS type 1 and DMRS type 2.

4. The method of claim 1, wherein the DMRS is generated based on the sequence initialization parameter determined based on the CDM group identifier for a PUSCH or a PDSCH scheduled by a downlink control information (DCI) format other than DCI format 0_0 or DCI format 1_0.

5. A method, performed by a base station (BS), of transmitting or receiving signals in a wireless communication system, the method comprising:
   receiving, from a user equipment (UE), UE capability information regarding sequence initialization of a demodulation reference signal (DMRS);
   transmitting, to the UE, DMRS configuration information determined based on the UE capability information; and
   transmitting the DMRS to the UE,
   wherein the DMRS is generated based on a sequence initialization parameter, $c_{init}$,
   wherein the sequence initialization parameter, $c_{init}$, is determined based on $(2^{17} \times ((N_{symb}^{slot} n_{s,f}^{\mu} + l + 1)(2N_{ID}^{\lambda} + 1)) + 2N_{ID}^{\lambda} + n_{SCID}) \mod 2^{31}$, a number of symbols per slot, $N_{symb}^{slot}$, a slot number within a frame, $n_{s,f}^{\mu}$, a symbol number within a slot, l, a code division multiplexing (CDM) group identifier, $\lambda$, a virtual cell identifier, $N_{ID}^{\lambda}$, and a value indicated by downlink control information, $n_{SCID}$, and
   wherein the CDM group identifier, $\lambda$, is included in the DMRS configuration information.

6. The method of claim 5, wherein the sequence initialization parameter of each of different CDM group identifiers determined to have the same $n_{SCID}$ has a different value based on the CDM group identifier.

7. The method of claim 5, wherein the sequence initialization parameter determined based on the CDM group identifier is applied to both DMRS type 1 and DMRS type 2.

8. A user equipment (UE) for transmitting or receiving signals in a wireless communication system, the UE comprising:
   a transceiver; and
   a processor,
   wherein the processor is configured to control the transceiver to
   transmit, to a base station (BS), UE capability information regarding sequence initialization of a demodulation reference signal (DMRS),
   receive, from the BS, DMRS configuration information determined based on the UE capability information, and
   receive the DMRS from the BS based on the DMRS configuration information,
   wherein the DMRS is generated based on a sequence initialization parameter, $c_{init}$,
   wherein the sequence initialization parameter, $c_{init}$, is determined based on $(2^{17} \times ((N_{symb}^{slot} n_{s,f}^{\mu} + l + 1)(2N_{ID}^{\lambda} + 1)) + 2N_{ID}^{\lambda} + n_{SCID}) \mod 2^{31}$, a number of symbols per slot, $N_{symb}^{slot}$, a slot number within a frame, $n_{s,f}^{\mu}$, a symbol number within a slot, l, a code division multiplexing (CDM) group identifier, λ, a virtual cell identifier, $N_{ID}^{\lambda}$, and a value indicated by downlink control information, $n_{SCID}$, and wherein the CDM group identifier, λ, is included in the DMRS configuration information.

9. The UE of claim 8, wherein the sequence initialization parameter of each of different CDM group identifiers determined to have the same $n_{SCID}$ has a different value based on the CDM group identifier.

10. The UE of claim 8, wherein the sequence initialization parameter determined based on the CDM group identifier is applied to both DMRS type 1 and DMRS type 2.

11. A base station (BS) for transmitting or receiving signals in a wireless communication system, the BS comprising:

a transceiver; and a processor, wherein the processor is configured to control the transceiver to receive, from a user equipment (UE), UE capability information regarding sequence initialization of a demodulation reference signal (DMRS), transmit, to the UE, DMRS configuration information determined based on the UE capability information, and transmit the DMRS to the UE, wherein the DMRS is generated based on a sequence initialization parameter, $c_{init}$, wherein the sequence initialization parameter, $c_{init}$, is determined based on $(2^{17} \times ((N_{symb}^{slot} n_{s,f}^{\mu} + l + 1)(2N_{ID}^{\lambda} + 1)) + 2N_{ID}^{\lambda} + n_{SCID}) \mod 2^{31}$, a number of symbols per slot, $N_{symb}^{slot}$, a slot number within a frame, $n_{s,f}^{\mu}$, a symbol number within a slot, l, a code division multiplexing (CDM) group identifier, λ, a virtual cell identifier, $N_{ID}^{\lambda}$, and a value indicated by downlink control information, $n_{SCID}$, and wherein the CDM group identifier, λ, is included in the DMRS configuration information.

12. The BS of claim 11, wherein the sequence initialization parameter of each of different CDM group identifiers determined to have the same $n_{SCID}$ has a different value based on the CDM group identifier.

13. The BS of claim 11, wherein the sequence initialization parameter determined based on the CDM group identifier is applied to both DMRS type 1 and DMRS type 2.

* * * * *